United States Patent [19]

Esterowitz et al.

[11] Patent Number: 5,086,432
[45] Date of Patent: Feb. 4, 1992

[54] RESONANTLY PUMPED, ERBIUM-DOPED, 2.8 MICRON SOLID STATE LASER WITH HIGH SLOPE EFFICIENCY

[75] Inventors: Leon Esterowitz, Springfield; Robert C. Stoneman, Alexandria, both of Va.

[73] Assignee: The United States of America as represented by the Secretary of the Navy, Washington, D.C.

[21] Appl. No.: 705,048

[22] Filed: May 23, 1991

[51] Int. Cl.$^5$ ........................ H01S 3/091; H01S 3/092
[52] U.S. Cl. .......................................... 372/71; 372/41
[58] Field of Search ........................ 372/39, 40, 41, 70, 372/71, 72

[56] References Cited

U.S. PATENT DOCUMENTS

| | | | |
|---|---|---|---|
| 4,922,496 | 5/1990 | Po | 372/71 |
| 4,974,230 | 11/1990 | Hemmati | 372/71 |
| 5,008,890 | 4/1991 | McFarlane | 372/71 |
| 5,014,279 | 5/1991 | Esterowitz et al. | 372/71 |
| 5,042,039 | 8/1991 | Edagawa et al. | 372/71 |

*Primary Examiner*—William L. Sikes
*Assistant Examiner*—Robert E. Wise
*Attorney, Agent, or Firm*—Thomas E. McDonnell; George Jameson

[57] ABSTRACT

A laser system and method for producing a laser emission at a wavelength of substantially 2.8 microns is disclosed. In a preferred embodiment of the invention, the laser system comprises a crystal having a host material doped with erbium; a laser cavity defined by first and second reflective elements at opposing ends of the crystal to form a reflective path therebetween; and resonant pumping means for directly pumping the $^4I_{11/2}$ upper laser state of the erbium with a pump beam at a preselected wavelength to cause the erbium-doped crystal to produce a laser emission corresponding to the $^4I_{11/2} \rightarrow {}^4I_{13/2}$ laser transition having a wavelength of substantially 2.8 microns, a portion of the laser emission at substantially 2.8 microns being outputted from one of the first and second reflective elements.

21 Claims, 4 Drawing Sheets

RESONANTLY PUMPED, ERBIUM-DOPED, 2.8 MICRON SOLID STATE LASER WITH HIGH SLOPE EFFICIENCY

BACKGROUND OF THE INVENTION

1. Field of the Invention

The present invention relates to lasers and particularly to a resonantly pumped, erbium-doped, 2.8 micron solid state laser system with high slope efficiency at or near room temperature.

2. Description of the Prior Art

It is well known that the human body is comprised of approximately 70% water, with various human tissues containing about 60% to 90% of water, and bone and cartilage containing about 30% to 40% of water. Since the 2.8 micron wavelength has a substantially maximum absorption in water, this 2.8 micron wavelength is the ideal wavelength to use for a large variety of medical laser applications on the human body. The 2.8 micron wavelength also offers a controlled absorption or penetration depth of, for example, one micron in the human body. As a result, this 2.8 micron wavelength is extremely useful in surgical applications where very precise cuts in area and/or depth are needed while minimizing damage to good tissue, bone and/or cartilage adjacent to, or under, the area to be ablated. A 2.8 micron wavelength laser could be used for precise surgery in such exemplary applications as brain surgery, neurosurgery, ear surgery, eye surgery, plastic surgery, burn treatment, dentistry, and the removal of malignancies.

Current lasers for generating this 2.8 micron wavelength use a variety of host or lasant materials with various pumping techniques for exciting the lasant material. Typically these lasers are flashlamp pumped. Such flashlamp pumped lasers are large, inefficient and expensive.

The development of high power semiconductor lasers has led to renewed interest in resonant pumping of solid state lasers based on rare earth active ions. Most of this research has been confined to the use of gallium arsenide (GaAs) and aluminum gallium arsenide (AlGaAs) semiconductor diode laser devices which perform at high power within the range of 750 to 870 nm (nanometers). These diode lasers have been used to pump $Er^{3+}$ (erbium) at about 800 nm (as well as to pump $Nd^{3+}$ at about 810 nm and $Tm^{3+}$ at about 790 nm). One such diode laser pumped solid state laser is disclosed in U.S. Pat. No. 5,014,279, issued May 7, 1991 to Esterowitz et al. In this patent, an erbium-doped crystal laser is resonantly pumped by a pump beam at about 800 nm from an AlGaAs diode laser to enable the erbium-doped crystal laser to produce a laser emission at substantially 2.8 microns with about a 10% slope efficiency.

The 800 nm resonant pumping diagram for the 2.8 micron $Er^{3+}$ $^4I_{11/2} \to ^4I_{13/2}$ laser is shown in FIG. 1. The $^4I_{9/2}$ state is resonantly pumped by the 800 nm pump beam and the $^4I_{11/2}$ upper laser state is populated as shown through the decay $^4I_{9/2} \to ^4I_{11/2}$. The decay of the $^4I_{9/2}$ state is primarily non-radiative. The radiative decay rate from the $^4I_{9/2}$ state is more than two orders of magnitude lower than the non-radiative decay rate. Therefore, the radiative decay processes $^4I_{9/2} \to ^4I_{13/2}$ and $^4I_{9/2} \to ^4I_{15/2}$, which would bypass the upper laser state and therefore reduce the efficiency of the 2.8 micron laser, can be ignored. However, there is a power loss experienced in the 800 nm resonant pumping scheme shown in FIG. 1 due to the $^4I_{9/2} \to ^4I_{11/2}$ phonon decay. This power loss reduces the slope efficiency in the 800 nm resonant pumping scheme of FIG. 1. More specifically, the maximum possible slope efficiency for a 2.8 micron laser pumped by the 800 nm resonant pumping scheme of FIG. 1 is given by $\lambda_{pump}/\lambda_{laser} = 28\%$.

Another loss mechanism that results in a still lower slope efficiency for the $Er^{3+}$ 800 nm resonant pumping scheme is illustrated in FIG. 2. Essentially, FIG. 2 illustrates the $Er^{3+}$ concentration-dependent self-quenching process $^4I_{9/2} + ^4I_{15/2} \to ^4I_{13/2} + ^4I_{13/2}$. The non-radiative self-quenching process $^4I_{9/2} + ^4I_{15/2} \to ^4I_{13/2} + ^4I_{13/2}$ bypasses the $^4I_{11/2}$ upper laser state and leads to a reduction in the pumping efficiency of the 800 nm-pumped 2.8 micron $Er^{3+}$ laser. This self-quenching process is a phonon-assisted dipole-dipole interaction between nearby $Er^{3+}$ ions in the crystal lattice. The probability for the occurrence of the self-quenching process increases at higher $Er^{3+}$ concentrations due to the stronger dipole-dipole interaction for smaller separation between $Er^{3+}$ ions. Therefore, the lifetime of the $^4I_{9/2}$ state decreases at higher concentrations.

FIG. 3 illustrates the fluorescence decay from the $^4I_{9/2}$ state for 4% and 30% concentrations of $Er^{3+}$ in a YLF crystal host. The natural logarithm of the fluorescence intensity is shown plotted against time. The $^4I_{9/2}$ state is excited by a pulsed dye laser having a pulse duration ($\approx 10$ nano seconds) significantly shorter than the $^4I_{9/2}$ lifetime. The $^4I_{9/2}$ lifetimes are obtained from a linear least-squares fit (the solid line in FIG. 3) to the fluorescence data. Similar fluorescence decay data are obtained for two intermediate $Er^{3+}$ concentrations, 8% and 16%, in the YLF crystal host. The $^4I_{9/2}$ lifetimes for the 4%, 8%, 16% and 30% concentrations are given in the following TABLE 1.

TABLE 1

| $Er^{3+}$ CONCENTRATION | $^4I_{9/2}$ LIFETIME | PUMPING EFFICIENCY |
|---|---|---|
| 4% | 6.46 μs | 100% |
| 8% | 6.39 μs | 99% |
| 16% | 6.10 μs | 94% |
| 30% | 5.02 μs | 78% |

The lifetimes for the 4% and 8% samples are very nearly the same, implying that for the 4% $Er^{3+}$ the $^4I_{9/2}$ decay is due almost entirely to phonon decay to the $^4I_{11/2}$ state. (The radiative decay rate from the $^4I_{9/2}$ state is negligible compared to the phonon decay rate.) The quantum efficiency for populating the $^4I_{11/2}$ upper laser state is given by $\tau(C)/\tau(0)$, where $\tau(C)$ is the $^4I_{9/2}$ lifetime for $Er^{3+}$ concentration C, and $\tau(0)$ is the limiting value of the lifetime for an arbitrarily small $Er^{3+}$ concentration. That is, $\tau(0)$ is due to purely phonon decay. Since $\tau(4\%) \approx \tau(8\%)$, it can be assumed that $\tau(0) \approx \tau(4\%)$. Using this approximation, the quantum efficiencies $\tau(C)/\tau(0)$ for pumping the $^4I_{11/2}$ upper laser state are given in the above TABLE 1.

The maximum possible slope efficiency for the 800 nm-pumped 2.8 micron $Er^{3+}$:YLF laser with $Er^{3+}$ concentration C is $(\tau(C)/\tau(0))(\lambda_{pump}/\lambda_{laser})$. From TABLE 1, the maximum possible slope efficiency for the 800 nm pumping scheme of FIG. 1 is therefore 22% for an $Er^{3+}$ concentration of 30%.

TABLE 1 also shows that the reduced efficiency for the 800 nm-pumped 2.8 micron laser due to the self-quenching process (previously discussed in relation to FIG. 2) can be avoided by using a low $Er^{3+}$ concentration. However, this approach is not suitable for the cw-pumped 2.8 micron $Er^{3+}$ laser due to the importance of the upconversion process $^4I_{13/2}+^4I_{13/2}\rightarrow^4I_{9/2}\cdot 2^4I_{15/2}$ for cw operation of the $^4I_{11/2}\rightarrow^4I_{13/2}$ transition. This transition is nominally self-terminating due to the long lifetime (13.2 milliseconds or ms) of the $^4I_{13/2}$ lower laser state relative to the lifetime (4.2 ms) of the $^4I_{11/2}$ upper laser state. The upconversion process $^4I_{13/2}+^4I_{13/2}\rightarrow^4I_{9/2}+^4I_{15/2}$, which is the inverse of the self-quenching process and is therefore increasingly efficient for higher $Er^{3+}$ concentrations, effectively reduces the lower laser state lifetime and allows cw operation of the otherwise self-terminated 2.8 micron laser transition. This effect has been demonstrated for the cw-pumped 2.8 micron $Er^{3+}$:YLF laser, for which a slope efficiency of 0.7% was obtained for an 8% $Er^{3+}$ concentration (See "CW and Pulsed 2.8 $\mu m$ Laser Emission from Diode-Pumped $Er^{3+}$:LiYF$_4$ at Room Temperature" by G. J. Kintz, R. Allen, and L. Esterowitz, Appl. Phys. Letts., Vol. 50 (22), pp. 1553-1555 (June 1, 1987)), and a 10% slope efficiency was obtained for a 30% $Er^{3+}$ concentration (See U.S. Pat. No. 5,014,279). This fundamental trade-off, i.e. higher cw efficiency due to the effective reduction in the lower laser state lifetime via the upconversion process for higher $Er^{3+}$ concentration, and lower efficiency due to the self-quenching loss for higher concentration, can not be avoided in the 800 nm pumping scheme.

FIG. 4 illustrates the polarized absorption spectrum for 30% $Er^{3+}$:YLF in the 800 nm region. Since YLF is a uniaxial crystal, the absorption is shown for both the c-axis (the solid line) and the a-axis (the dotted line) polarizations. Note that the absorption spectrum in the 800 nm region is strongly polarized. The peak c-axis absorption is approximately five times stronger than the peak a-axis absorption. As a result of this weak a-axis absorption in the 800 nm region, a polarization-coupled beam-combining pumping scheme can not be employed in the 800 nm region. Also note the narrowness of the absorption spectrum for both polarizations in the 800 nm region. The strongest c-axis absorption peaks in the 800 nm region have a width of only 1 nm (FWHM or full width at half maximum).

OBJECTS OF THE INVENTION

Accordingly, one object of the invention is to efficiently generate a laser emission at a wavelength of substantially 2.8 microns with a high slope efficiency at or near room temperature.

Another object of the invention is to provide a resonantly pumped, 2.8 micron solid state laser system and method for operating same.

Another object of the invention is to provide a resonantly pumped 2.8 micron Er:YLF laser system at 970 nm with 17% slope efficiency.

Another object of the invention is to provide a 2.8 micron solid state laser that can be resonantly pumped with at least one InGaAs laser diode at 970 nm.

Another object of the invention is to provide a 2.8 micron solid state laser that can be resonantly pumped with a Ti:Sapphire pump laser at 970 nm.

Another object of the invention is to provide a continuous wave, laser diode pumped, erbium-doped, solid state laser system for producing a continuous wave laser emission at a wavelength of substantially 2.8 microns.

Another object of the invention is to provide a resonantly pumped Er:YLF continuous wave laser system at substantially 2.8 microns with at least a 10% slope efficiency, but preferrably with at least a 17% slope efficiency.

A further object of the invention is to provide a resonantly pumped, $Er^{3+}$-doped, solid state laser system for directly pumping the $^4I_{11/2}$ upper laser state of the $Er^{3+}$ with a pump beam at a wavelength of about 970 nm to cause the $Er^{3+}$-doped laser to produce a laser emission corresponding to the $^4I_{11/2}\rightarrow^4I_{13/2}$ laser transition and having a wavelength of substantially 2.8 microns.

SUMMARY OF THE INVENTION

These and other objects of the invention are achieved by providing a resonantly-pumped, solid state laser system which comprises an erbium-doped, 2.8 micron, solid state laser and a resonant pumping means for directly pumping the $^4I_{11/2}$ upper laser state of the erbium with a pump beam at a wavelength of about 970 nm to cause the erbium-doped laser to produce a laser emission corresponding to the $^4I_{11/2}\rightarrow^4I_{13/2}$ laser transition having a wavelength of substantially 2.8 microns. The resonant pumping means can be, for example, at least one InGaAs laser diode or a Ti:Sapphire pump laser.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

As stated before, the invention is a resonantly-pumped, solid state laser system which comprises an erbium-doped, 2.8 micron, solid state laser and a resonant pumping means for directly pumping the $^4I_{11/2}$ upper laser state of the erbium with a pump beam at a wavelength of about 970 nm to cause the erbium-doped laser to produce a laser emission corresponding to the $^4I_{11/2}\rightarrow^4I_{13/2}$ laser transition having a wavelength of substantially 2.8 microns.

Figure 5:
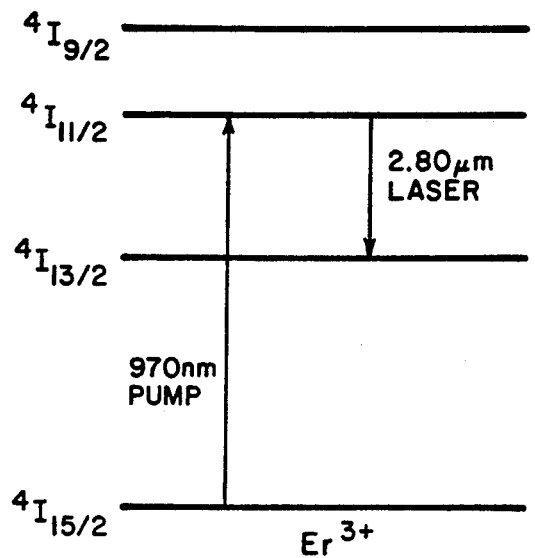
FIG. 5 illustrates the 970 nm resonant pumping diagram for a 2.8 micron $Er^{3+}$ laser with a $^4I_{11/2}\rightarrow^4I_{13/2}$ laser transition.

FIG. 5 illustrates the 970 nm resonant pumping diagram for a 2.8 micron $Er^{3+}$ laser with a $^4I_{11/2}\rightarrow^4I_{13/2}$ laser transition. As shown in FIG. 5, the $^4I_{11/2}$ upper laser state is pumped directly by a 970 nm pump beam.

Figure 1:
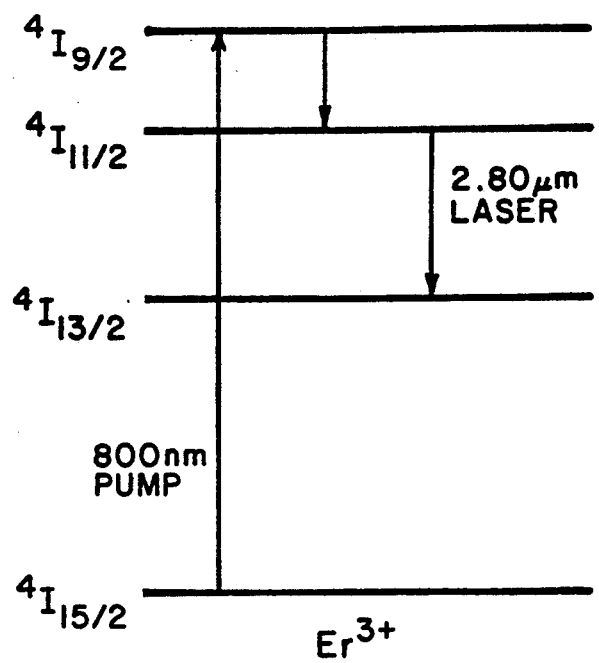
FIG. 1 illustrates the 800 nm resonant pumping diagram for a 2.8 micron $Er^{3+}$ laser with a $^4I_{11/2}\rightarrow^4I_{13/2}$ laser transition.
Figure 2:
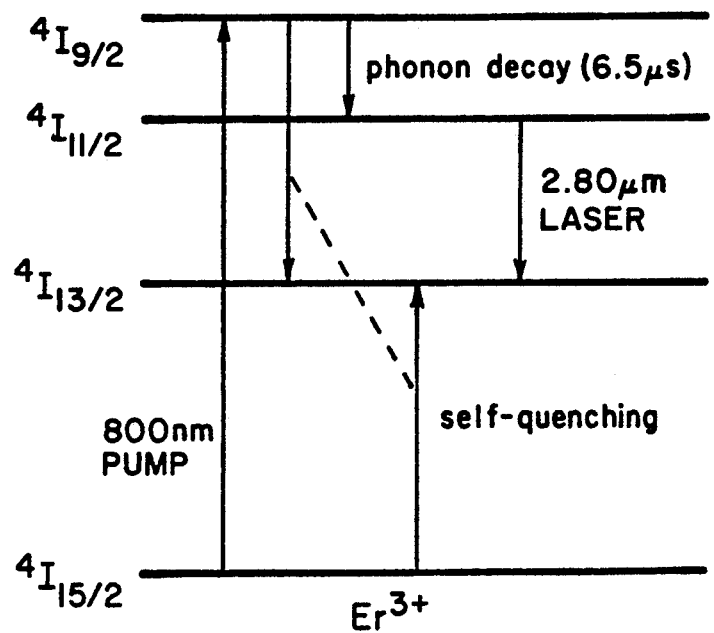
FIG. 2 illustrates the $Er^{3+}$ concentration-dependent, self-quenching process of $^4I_{9/2}+^4I_{15/2}\rightarrow^4I_{13/2}+^4I_{13/2}$.
Figure 3:
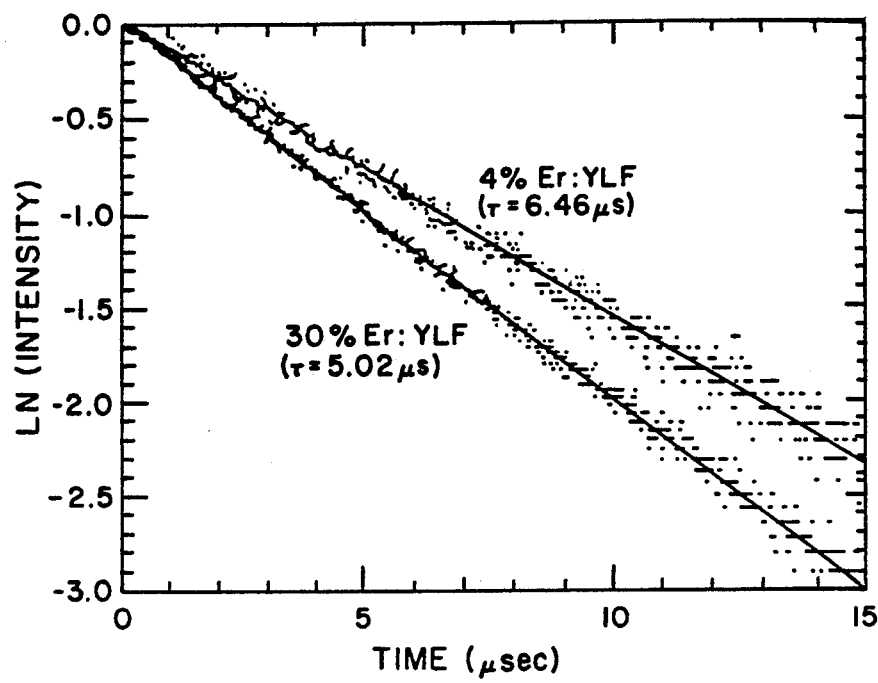
FIG. 3 illustrates the fluorescence decay from the $^4I_{9/2}$ state for 4% and 30% concentrations in YLF.

The maximum possible slope efficiency for a 2.8 micron laser pumped by this 970 nm resonant pumping scheme of FIG. 5 is given by $\lambda_{pump}/\lambda_{laser} = 35\%$, while the maximum possible slope efficiency for a 2.8 micron laser pumped by the previously discussed 800 nm resonant pumping scheme of FIG. 1 is 28%. By directly pumping into the $^4I_{11/2}$ upper laser state of the $Er^{3+}$ laser, the 970 nm pumping scheme of FIG. 5 has a higher slope efficiency than the 800 nm pumping scheme of FIG. 1, because both the loss due to the phonon decay in the 800 nm pumping scheme of FIG. 1 and the $Er^{3+}$ concentration-dependent self-quenching process $^4I_{9/2} + ^4I_{15/2} \rightarrow ^4I_{13/2} + ^4I_{13/2}$ of FIG. 2 are avoided completely.

The above-mentioned self-quenching process further reduces the slope efficiency of the 800 nm pumped 2.8 micron $Er^{3+}$:YLF laser. From the discussion of TABLE 1 above, it will be recalled that the maximum possible slope efficiency for the 800 nm-pumped 2.8 micron $Er^{3+}$:YLF laser with an $Er^{3+}$ concentration of 30% is 22%. Therefore, the maximum possible slope efficiency of 35% for the 970 nm pumping scheme of FIG. 5 is more than 50% higher than the maximum possible slope efficiency of 22% for the 800 nm pumping scheme in 30% $Er^{3+}$:YLF.

Thus, as discussed above, the 2.8 micron $Er^{3+}$:YLF $^4I_{11/2} \rightarrow ^4I_{13/2}$ laser has a higher slope efficiency for resonant pumping into the 970 nm absorption band than for the 800 nm pump band. The improved efficiency is due to the lower energy of the 970 nm pump radiation, and the avoidance of the self-quenching process $^4I_{9/2} + ^4I_{15/2} \rightarrow ^4I_{13/2} + ^4I_{13/2}$, which partially bypasses the upper laser state for 800 nm pumping. These advantages result from the direct pumping of the $^4I_{11/2}$ upper laser state in the 970 nm pumping scheme of FIG. 5.

Figure 6:
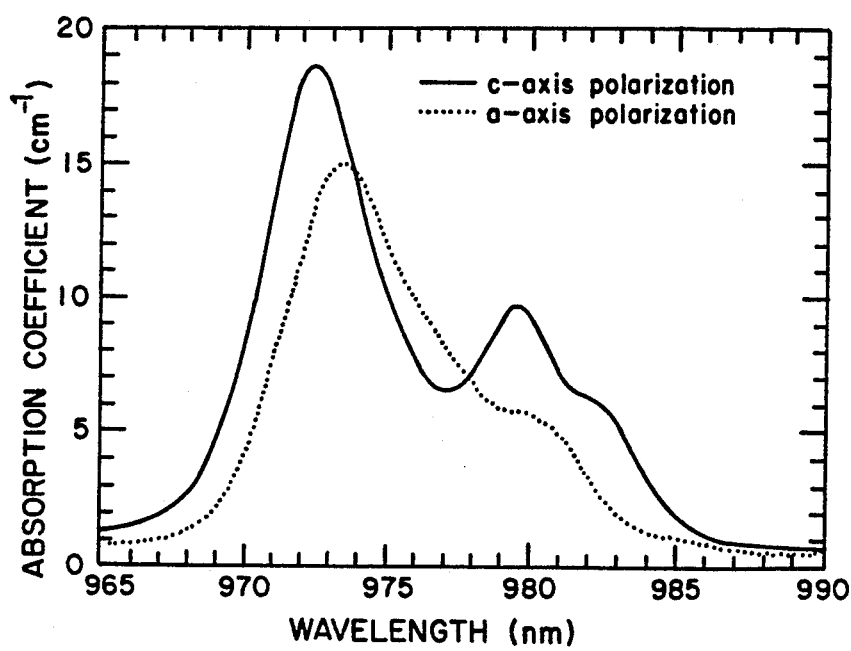
FIG. 6 illustrates the polarized absorption spectrum for 30% $Er^{3+}$:YLF in the 970 nm region.

FIG. 6 illustrates the polarized absorption spectrum for 30% $Er^{3+}$:YLF in the 970 nm region. The absorption spectrum in the 970 nm region of FIG. 6 has two advantages over that in the 800 nm region shown in FIG. 4.

Figure 4:
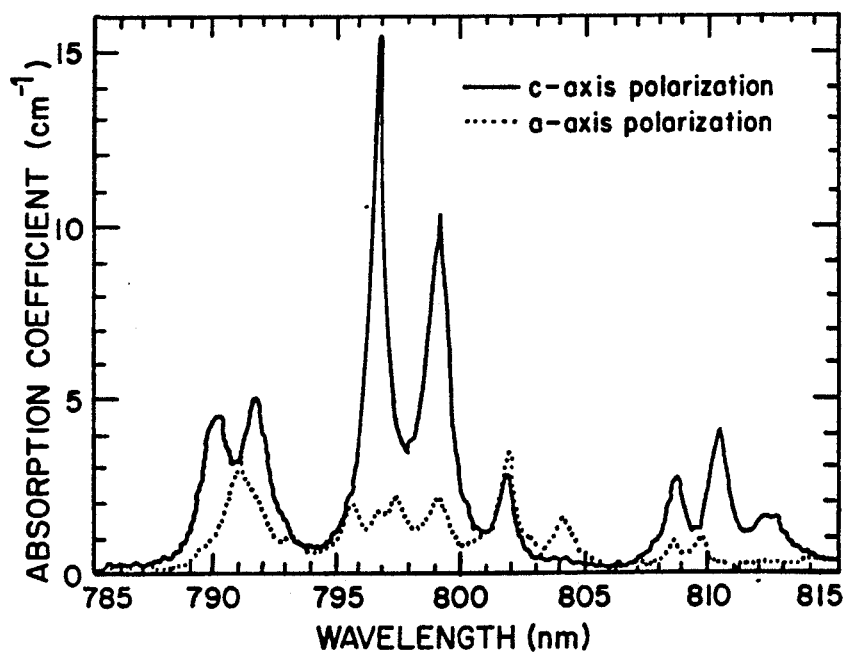
FIG. 4 illustrates the polarized absorption spectrum for 30% $Er^{3+}$:YLF in the 800 nm region.

In regard to a first advantage to pumping at 970 nm, it will be recalled that the absorption in the 800 nm region is strongly polarized and that the peak c-axis absorption is five times stronger than the peak a-axis absorption, as shown in FIG. 4. On the other hand, as shown in FIG. 6, the polarization is much less pronounced in the 970 nm region. A polarization-coupled, beam-combining pumping scheme can therefore be employed in the 970 nm region shown in FIG. 6, but the a-axis absorption in the 800 nm region shown in FIG. 4 is too weak to facilitate such a pumping scheme.

The second advantage for pumping at 970 nm lies in the broad and smooth character of the absorption spectrum for both the c-axis (the solid line) and the a-axis (the dotted line) polarizations in the 970 nm region shown in FIG. 6. For both the c-axis and the a-axis, the primary absorption feature in the 970 nm region is broader than 5 nm (FWHM). In contrast, the strongest c-axis absorption peaks in the 800 nm region have a width of only 1 nm (FWHM), as shown in FIG. 4.

Figure 7:
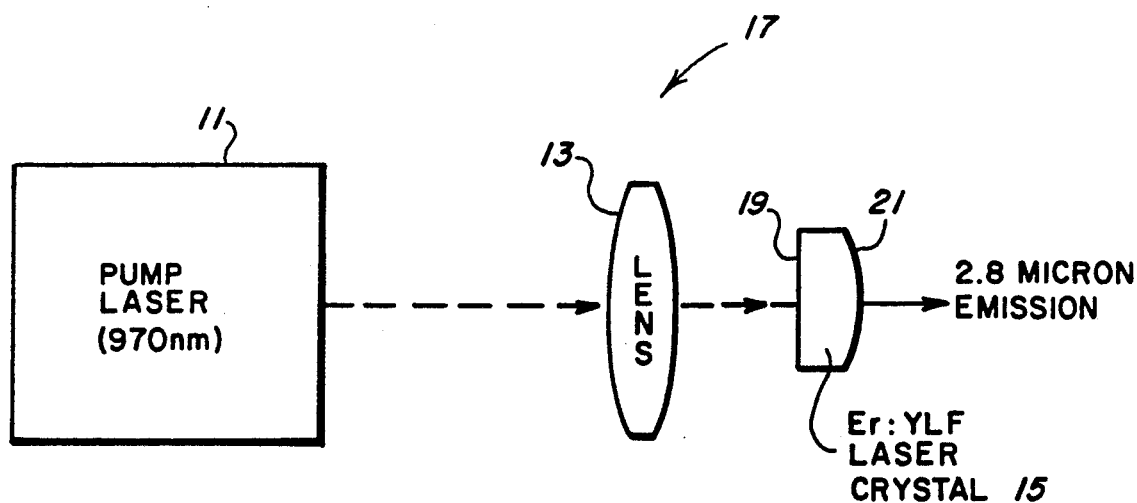
FIG. 7 illustrates a preferred embodiment of the invention.

Referring now to FIG. 7, a preferred embodiment of the invention is shown. In FIG. 7, a pump laser 11 transmits a cw (continuous wave) pump beam at a wavelength of substantially 970 nm (nano meters). This 970 nm pump beam is longitudinally focused by an optical system 13 into an erbium-doped, yttrium lithium fluoride ($Er^{3+}$:YLF) crystal or rod 15 of a solid state laser 17 to resonantly pump the $Er^{3+}$:YLF crystal 15. In response to this 970 nm pump beam the Er:YLF crystal 15 produces an output cw laser emission at substantially 2.8 microns with a high slope efficiency.

The pump laser 11 can comprise one or more single lasers or even one or more laser diode arrays, with each laser diode preferably being a strained-layer indium gallium arsenide (InGaAs) diode for providing a laser emission at a wavelength of substantially 970 nm. Strained-layer InGaAs diode lasers have been shown to have lower threshold current densities and less susceptibility to damage than AlGaAs diode lasers. In addition, the pump laser 11 can be a Ti:Sapphire (titanium sapphire) pump laser, or any other suitable optical source, for producing a 970 nm pump beam.

The optical system 13, which can be a focusing lens or other suitable optical arrangement, is utilized to collect and focus the pump beam from the pump laser 11 into the crystal 15 to essentially match the 970 nm pump beam to the cavity mode of the erbium-doped crystal 15.

The Er:YLF crystal 15 is a 30% erbium-doped LiYF$_4$ crystal, 8 mm long, with high reflectivity coatings (not shown) on opposite front and back end surfaces 19 and 21, respectively, of the crystal 15 to form a monolithic laser cavity (not shown). The front end surface 19 of the crystal 15 is flat and is high reflectivity (HR)-coated at the 2.8 micron laser wavelength and anti reflectivity (AR)- coated at the 970 nm pump wavelength. The back end surface 21 of the crystal 15 is concave with an 1 cm (centimeter) radius of curvature and is the output coupler of the solid state laser 17 with a 99.7% reflectivity at 2.8 microns and 100% reflection for the 970 nm pump beam.

In the embodiment shown in FIG. 7, the yttrium lithium fluoride (YLF) material of the crystal 15 forms the laser host material or lasant material which is doped with a 30% concentration of erbium, which is the activator material. Upon being pumped by the pump beam at the wavelength of 970 nm, the Er:YLF crystal 15 produces a laser emission at substantially 2.8 microns with a slope efficiency of at least 10%, but preferably at least 17% (to be discussed).

At the 30% erbium concentration in the YLF host material of the crystal 15, an advantageous upconversion process takes place and aids in the laser operation of the crystal 15. In addition, better mode matching is also achieved in the crystal 15 at this 30% concentration of the erbium activator in the crystal 15.

It should be noted at this time that experiments and calculations have indicated that the optimum percent concentration of the erbium activator (or erbium activator ions) is between 25% and 65% erbium in YLF. It should also be noted that, in addition to YLF, other laser host materials can be employed in the crystal 15, such as BaY$_2$F$_8$ (barium yttrium fluoride), GGG (gadolinium gallium garnet), GSGG (gadolinium scandium gallium garnet), LLGG (lanthanum lutetium gallium garnet), GSAG (gadolinium scandium aluminum garnet), NaLiF$_4$ (sodium lithium fluoride) and YSGG (yttrium scandium gallium garnet). Each of these laser host materials would also be doped with a percent concentration of erbium activator ions between 25% and 65%.

By the use of the term "percent concentration of erbium activator ions" it is meant the percent of substitution of the yttrium ions in YLF, BaY$_2$F$_8$, or YSGG by the erbium (Er) activator ions, or the percent of substitution of the gadolinium ions in GGG, GSGG, LLGG, or GSAG by the Er activator ions, or the percent of substitution of the sodium ions in NaLiF$_4$ by the Er activator ions. For example, with a 30% concentration of erbium activator ions selected, erbium would replace 30% of the yttrium in the LiYF$_4$ or BaY$_2$F$_8$, or would replace 30% of the gadolinium in the GSGG or GSAG.

Figure 8:
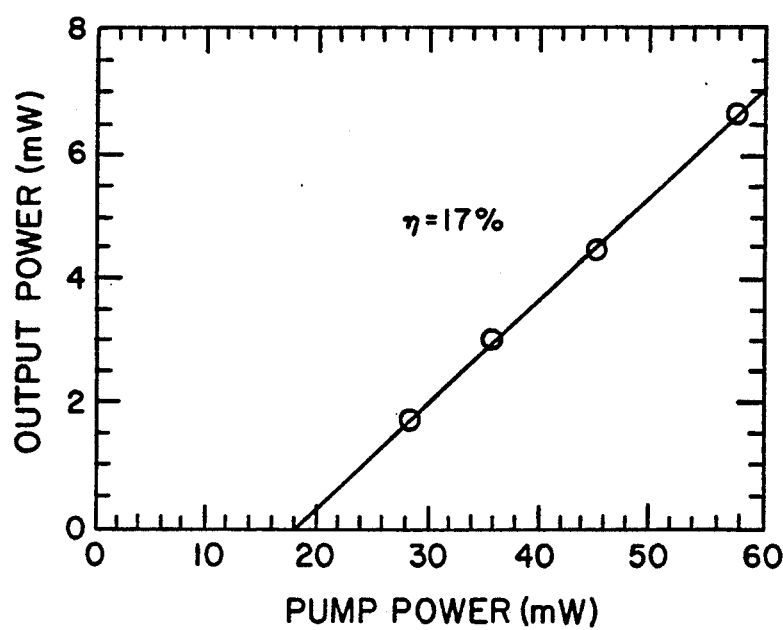
FIG. 8 illustrates an exemplary plot of the performance of the 970 nm-pumped, 2.8 micron, $Er^{3+}$:YLF laser output power as a function of the 970 nm pump power.

Referring now to FIG. 8, the 970 nm-pumped 2.8 micron Er$^{3+}$:YLF cw laser performance is shown. The 2.8 micron output power is plotted versus the incident 970 nm pump power. The 970 nm-pumped 2.8 micron Er$^{3+}$:YLF laser is therefore significantly more efficient than the above-discussed prior art 800 nm-pumped laser, for which a 10% slope efficiently has been achieved. The expected advantage for the 970 nm pumping scheme over the 800 nm pumping scheme, due to the direct pumping of the $^4I_{11/2}$ upper laser state in the 970 nm pumping scheme, is therefore reflected in the improved 2.8 micron laser efficiency.

The 2.8 micron Er$^{3+}$:YLF $^4I_{11/2} \rightarrow {^4I_{13/2}}$ laser has been shown to have higher efficiency for resonant pumping into the 970 nm absorption band than for the 800 nm pump band. This improved efficiency is due to the lower energy of the 970 nm pump radiation, and the avoidance of the self-quenching $^4I_{9/2} + {^4I_{15/2}} \rightarrow {^4I_{13/2}} + {^4I_{13/2}}$ which partially bypasses the $^4I_{11/2}$ upper laser state for 800 nm pumping. These advantages result from the direct pumping of the $^4I_{11/2}$ upper laser state in the 970 nm pumping scheme. There are several other advantages of the 970 nm pumping scheme in addition to the ones discussed above. The 970 nm absorption is stronger and broader than the 800 nm absorption, as discussed in relation to FIGS. 4 and 6. This is an important consideration for pumping with high power diode laser arrays. Also, with a 970 nm pumping of a 2.8 micron Er$^{3+}$:YLF $^4I_{11/2} \rightarrow {^4I_{13/2}}$ laser, the Er$^{3+0}$ concentration can be increased, thereby achieving stronger pump absorption, without reducing the $^4I_{11/2}$ upper laser level pumping quantum efficiency. With 800 nm pumping, concentration quenching reduces the pumping quantum efficiency with increased Er$^{3+}$ concentration.

Therefore, what has been described in a preferred embodiment is a resonantly pumped, solid state laser system which comprises an erbium-doped, 2.8 micron, solid state laser and a resonant pumping means for directly pumping the $^4I_{11/2}$ upper laser state of the erbium with a pump beam at a wavelength of about 970 nm to cause the erbium-doped laser to produce a laser emission corresponding to the $^4I_{11/2} \rightarrow {^4I_{13/2}}$ laser transition and having a wavelength of substantially 2.8 microns at a slope efficiency of at least 10%, but preferably at least 17%.

It should therefore readily be understood that many modifications and variations of the present invention ar possible within the purview of the claimed invention. It is therefore to be understood that, within the scope of the appended claims, the invention may be practiced otherwise than as specifically described.

What is claimed and desired to be secured by Letters Patent of the United States is:

1. A laser system comprising:
   a crystal having a host material doped with erbium;
   a laser cavity defined by first and second reflective elements at opposing ends of said crystal to form a reflective path therebetween; and
   resonant pumping means for directly pumping the $^4I_{11/2}$ upper laser state of said erbium with a pump beam at a preselected wavelength to cause the erbium-doped crystal to produce a laser emission corresponding to the $^4I_{11/2} \rightarrow {^4I_{13/2}}$ laser transition having a wavelength of substantially 2.8 microns;
   one of the first and second reflective elements outputting a portion of said laser emission at substantially 2.8 microns.

2. The laser system of claim 1 wherein said resonant pumping means includes:
   at least one InGaAs laser diode for producing the pump beam at a preselected wavelength of approximately 970 nm.

3. The laser system of claim 1 wherein said resonant pumping means includes:
   a Ti:Sapphire pump laser for producing said pump beam at a preselected wavelength of approximately 970 nm.

4. The laser system of claim 1 wherein:
   said host material is selected from the group consisting of YLF, BaY$_2$F$_8$, GGG, GSGG, LLGG, GSAG, NaLiF$_4$, YSGG and mixtures thereof.

5. The laser system of claim 4 wherein:
   said crystal produces the laser emission at a slope frequency of at least 11%.

6. The laser system of claim 5 wherein:
   said host material is doped with a percent concentration of erbium between 25% and 65%.

7. The laser system of claim 5 wherein:
   said host material is doped with approximately a 30% concentration of erbium.

8. The laser system of claim 1 wherein:
   said host material is selected from the group consisting of YLF, BaY$_2$F$_8$, GGG, GSGG, LLGG and mixtures thereof.

9. The laser system of claim 8 wherein:
   said crystal produces the laser emission at a slope efficiency of at least 14%.

10. The laser system of claim 1 wherein:
    said host material is selected from the group consisting of YLF, BaY$_2$F$_8$ and mixtures thereof.

11. The laser system of claim 10 wherein:
    said crystal produces the laser emission at a slope efficiency of a least 17%.

12. The laser system of claim 11 wherein:
    said host material is doped with a concentration of erbium between 25% and 65%.

13. The laser system of claim 11 wherein:
    said host material is doped with approximately a 30% concentration of erbium.

14. The laser system of claim 1 further including:
    optical means disposed between said resonant pumping means and said crystal for matching the pump beam to said crystal.

15. The laser system of claim 1 wherein:
    said first reflective element has a high reflectance coating at the substantially 2.8 micron wavelength and an anti-reflective coating at the preselected wavelength; and
    said second reflective element has a reflectivity of about 99% at 2.8 microns to output a portion of said laser emission at substantially 2.8 microns.

16. The laser system of claim 1 wherein:
    said resonant pumping means includes at least one InGaAs laser diode for producing the pump beam at a preselected wavelength of approximately 970 nm;
    said host material is selected from the group consisting of YLF and BaY$_2$F$_8$, and said host material is doped with a percent concentration of erbium between 25% and 65%; and said crystal produces the laser emission at a slope efficiency of a least 17%.

17. The laser system of claim 1 wherein:
said resonant pumping means includes a Ti:Sapphire pump laser for producing the pump beam at a preselected wavelength of approximately 970 nm;
said host material is selected from the group consisting of YLF and BaY$_2$F$_8$, and said host material is doped with a percent concentration of erbium between 25% and 65%; and
said crystal produces the laser emission at a slope efficiency of at least 17%.

18. A method for producing a laser emission at a wavelength of substantially 2.8 microns, said method comprising the steps of:
utilizing a crystal having a host material doped with erbium;
defining a laser cavity by disposing first and second reflective elements at opposing ends of the crystal to form a reflective path therebetween;
resonantly directly pumping the $^4I_{11/2}$ upper laser state of the erbium-doped crystal with a pump beam at a preselected wavelength to cause the erbium-doped crystal to produce a laser emission corresponding to the $^4I_{11/2} \rightarrow {}^4I_{13/2}$ laser transition having a wavelength of substantially 2.8 microns; and
outputting a portion of the laser emission at substantially 2.8 microns from one of the first and second reflective elements.

19. The method of claim 18 wherein said resonantly directly pumping step includes the step of:
selecting the pump beam to have a wavelength of substantially 970 nm.

20. The method of claim 18 further including the steps of:
selecting the host material from the group consisting of YLF and BaY$_2$F$_8$; and
doping the host material with a predetermined percent concentration of erbium to cause the erbium-doped crystal to produce the laser emission at a slope efficiency of at least 17%.

21. The method of claim 18 further including the steps of:
selecting YLF as the host material; and
doping the YLF host material with approximately a 30 percent concentration of erbium to cause the erbium-doped YLF crystal to produce the laser emission at a slope efficiency of at least 17%.

* * * * *